United States Patent
Kashio et al.

(10) Patent No.: US 7,715,992 B2
(45) Date of Patent: May 11, 2010

(54) FAULT MONITORING METHOD FOR WORK MACHINE

(75) Inventors: Eiji Kashio, Tokyo (JP); Yoshinobu Sugita, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 11/815,908

(22) PCT Filed: Dec. 15, 2006

(86) PCT No.: PCT/JP2006/325564

§ 371 (c)(1),
(2), (4) Date: Aug. 9, 2007

(87) PCT Pub. No.: WO2007/072937

PCT Pub. Date: Jun. 28, 2007

(65) Prior Publication Data

US 2008/0133176 A1 Jun. 5, 2008

(30) Foreign Application Priority Data

Dec. 20, 2005 (JP) .............................. 2005-366621

(51) Int. Cl.
*G01B 3/44* (2006.01)
*G01B 3/52* (2006.01)
*G06F 11/30* (2006.01)
*G21C 17/00* (2006.01)

(52) U.S. Cl. ........................................ 702/34; 702/185

(58) Field of Classification Search ............. 702/33–35, 702/182–185, 41, 43, 44, 179, 199; 700/108–110; 324/500; 714/25, 33, 100; 318/400.15, 434; 901/32

See application file for complete search history.

(56) References Cited

U.S. PATENT DOCUMENTS 5,900,822 A 5/1999 Sand et al.
2008/0243434 A1* 10/2008 Boutin ....................... 702/179

FOREIGN PATENT DOCUMENTS

| JP | 05-346812 | 12/1993 |
| JP | 11-129186 | 5/1999 |
| JP | 2005-176571 | 6/2005 |

OTHER PUBLICATIONS

English Translation of JP 2005-176571, Jun. 30, 2005.*

* cited by examiner

*Primary Examiner*—Michael P Nghiem
(74) *Attorney, Agent, or Firm*—Rankin, Hill & Clark LLP

(57) ABSTRACT

A fault monitoring method for a robot (10) or other work machine (30) is disclosed, in which the period that starts when the robot or the work machine starts moving and ends when the work machine stops moving is set as one unit, the difference between the maximum torque and the minimum torque within the unit is set as a maximum fluctuation range, a fluctuation range control value is set on the basis of the maximum fluctuation range, an average is taken of the maximum fluctuation ranges at plural points during operation, a second average value (t1, t10, t100) is determined, and a fault is determined to have occurred when the second average value exceeds the fluctuation range control value.

5 Claims, 8 Drawing Sheets

FAULT MONITORING METHOD FOR WORK MACHINE

TECHNICAL FIELD

The present invention relates to a fault monitoring method for a robot or other work machines in which a servo motor is used as a drive source.

BACKGROUND ART

Servo motors are a type of control motor, and are characterized as having exceptional rotational speed control and positional control. Servo motors are installed in a variety of work machines, and in particular are widely employed as driving sources for robots.

Servo motors are capable of directly driving a load. However, the load is often driven via a reducer or other power transmission mechanism. This is due to the fact that the output torque from the servo motor can be markedly increased when the load is driven via a reducer. In addition, if the reducer is composed of a belt, chain, or drive shaft, a benefit will be presented in that the movement can be transmitted to a location that is distant from the servo motor.

The fact that faults occur in servo motors and power transmission mechanisms in a work machine must be taken into account.

Faults that occur in work machines range from serious faults, which are critical enough to necessitate an emergency shutdown of the machine; minor faults, which cause no interference even if operation is continued until the time of the next repair; and moderate faults, which are between the serious faults and the minor faults in terms of severity.

The presence of faults in the servo motor itself can be determined by detecting anomalies via monitoring electric current values or performing other electrical monitoring. On the other hand, anomalies are difficult to detect when the servo monitor is operating normally but a fault has occurred in the power transmission mechanism. A detecting technique such as disclosed in JP-5-346812 A and JP-11-129186 A has been required.

In the anomaly-detecting device disclosed in JP-5-346812 A, a post-feedback command signal is integrated when the servo motor is being controlled by a controlling device via feedback. The time required for the resulting integration value to reach saturation is monitored. For example, the servo motor drives an arm as a load via a belt. However, if the belt breaks, the load suddenly changes, and the integration value changes markedly. Specifically, the load decreases, which causes fluctuations in the load to become less pronounced and the magnitude of the post-feedback command signal to decrease. When this occurs, the time required for the integration value to reach saturation (saturation time) increases. If a configuration is used in which an anomaly is determined when the saturation time extends past a reference time, the breaking of a belt or another anomaly can be detected. However, an anomaly cannot be detected if the change in the load fluctuation is small. In other words, the anomaly detecting device disclosed in JP-5-346812 A is intended for discovering serious faults such as the breaking of a belt, and is unable to address minor faults.

In the work robot disclosed in JP-11-129186 A, the work rate W1 on the drive side of a driving shaft is calculated on the basis of a driving current Ii and actual angle θi of a servo motor. A work rate W0 on the load side of the driving shafts is additionally calculated on the basis of the actual angle θi and a motion equation that relates to the particle model of a robot mechanism part. The difference or ratio between the resulting work rate W1 and the work rate W0 is compared with an established criterion. If a gear or the like is worn down due to change over time, the work rate W1 will generally be greater than the work rate W0 during acceleration. The difference or ratio at this time will become progressively more pronounced as the wear on the gear or other components increases. In other words, a detectable difference or ratio will not be generated in the event of small-scale wear. This approach is suitable for serious faults in which a difference occurs between the work rates, but is unsuitable for minor faults in which a difference between the work rates is not likely to occur.

A first problem arises in that a monitoring technique that corresponds to minor faults is not established in JP-5-346812 A or JP-11-129186 A.

It is also possible that, e.g., a turntable and a robot occupy a single work area. The turntable, in which a servo motor is used as a driving source, would be monitored by the anomaly-detecting device disclosed in JP-5-346812 A, and the robot would be monitored by the anomaly sensor of the work robot disclosed in JP-11-129186 A. Faults will be detected in the turntable and robot using different fault monitoring systems.

In other words, when there are multiple types of work machines manufactured by different makers, the fault monitoring systems attached to the servo motors for driving the work machines tend to have various functions. In such instances, diverse fault monitoring systems must be arranged in the work area (the production site or the surrounding area), substantial effort is required to maintain control over the systems, and greater space is needed to accommodate the systems.

In other words, the second problem arises from the fact that no technique has been established for allowing central control over a variety of servo motors when a variety of work machines are present.

A demand has accordingly arisen for a technique whereby a monitoring technique corresponding to minor faults can be performed and a variety of servo motors can be centrally controlled.

DISCLOSURE OF THE INVENTION

According to the present invention, there is provided a fault monitoring method for a robot or other work machine, wherein output from a servo motor is transmitted via a reducer or other power transmission mechanism and a load is driven, the method comprising the steps of: acquiring first torque data generated from the servo motor, in units each of which starts when the motor starts operating and ends when the motor stops operating; selecting a maximum first torque fluctuation range designated by the difference between a maximum torque and a minimum torque for each unit obtained from the acquired first torque data; collecting maximum fluctuation ranges of the first torque for a plurality of cycles and obtaining a first average value; selecting a fluctuation range control value by multiplying the first average value by a factor greater than 1.0; acquiring second torque data generated from the servo motor, in units each of which starts when the motor starts operating and ends when the motor stops operating, after the fluctuation range control value has been selected; selecting a maximum second torque fluctuation range designated by the difference between a maximum torque and a minimum torque among the units obtained from the acquired second torque data; collecting a second maximum fluctuation range for a plurality of cycles and obtaining a second average value; making a comparison to determine whether the second average value exceeds the fluctuation range control value; and determining that a fault has occurred when the second average value exceeds the control value for the fluctuation range in the comparison.

The average value of the maximum fluctuation range of the torque is used as a control value and a monitoring value.

The difference between the maximum torque and minimum torque per unit is the fluctuation range. When the temperature or another external factor changes and the maximum torque increases, the minimum torque will also increase. In other words, the fluctuation range will remain steady without changing markedly even if the temperature or another external factor changes. The use of a torque fluctuation range is beneficial for this reason.

However, there are instances in which a noise signal is mixed into the signal system or another event occurs and the fluctuation range momentarily undergoes a substantial change. The average value is used as a control value in such instances. As a result, the effects of instantaneous fluctuations can be reduced.

Instantaneous changes are thus ignored. Therefore, this configuration is favorable in monitoring minor faults that worsen only gradually, and a technique allowing minor faults to be addressed can be provided for a robot or another work machine in which a servo motor is used as a driving source.

Preferably, a plurality of servo motors is provided, a fluctuation range control value is set for each of the servo motors, and the servo motors are uniformly managed by a single checking unit. In other words, control is provided using torque, which is a joint index that characterizes different types of servo motors. As a result, the servo motors can be centrally controlled by a single checking unit. If uniform control is provided, the motors will be easier to control, only one fault monitoring system will suffice, and the installation space for the system can be reduced.

Desirably, the first torque data and second torque data are acquired from a motor driver or controller for controlling the servo motors. A torque sensor need not be newly prepared and installed. Therefore, the present invention can readily be applied to pre-existing work machines, and the cost of installation can be reduced even in new work machines.

Preferably, the acquired torque data is converted to consolidated data by a data converter and then sent to the checking unit. Having the data be consolidated by the data converter will allow a plurality of torque data sets to be efficiently processed and sent to an input unit.

In a preferred form, a warning signal is generated from an alerting unit when a fault is determined to be present during a fault-determining step. If a lamp is illuminated, an alarm is sounded, or another action is performed on the basis of the warning signal, a worker can be alerted, and serious accidents can be averted.

BRIEF DESCRIPTION OF THE DRAWINGS

A preferred embodiment of the present invention will be described in more detail below, by way of example only, with reference to the accompanying drawings, in which.

BEST MODE FOR CARRYING OUT THE INVENTION

Figure 1:
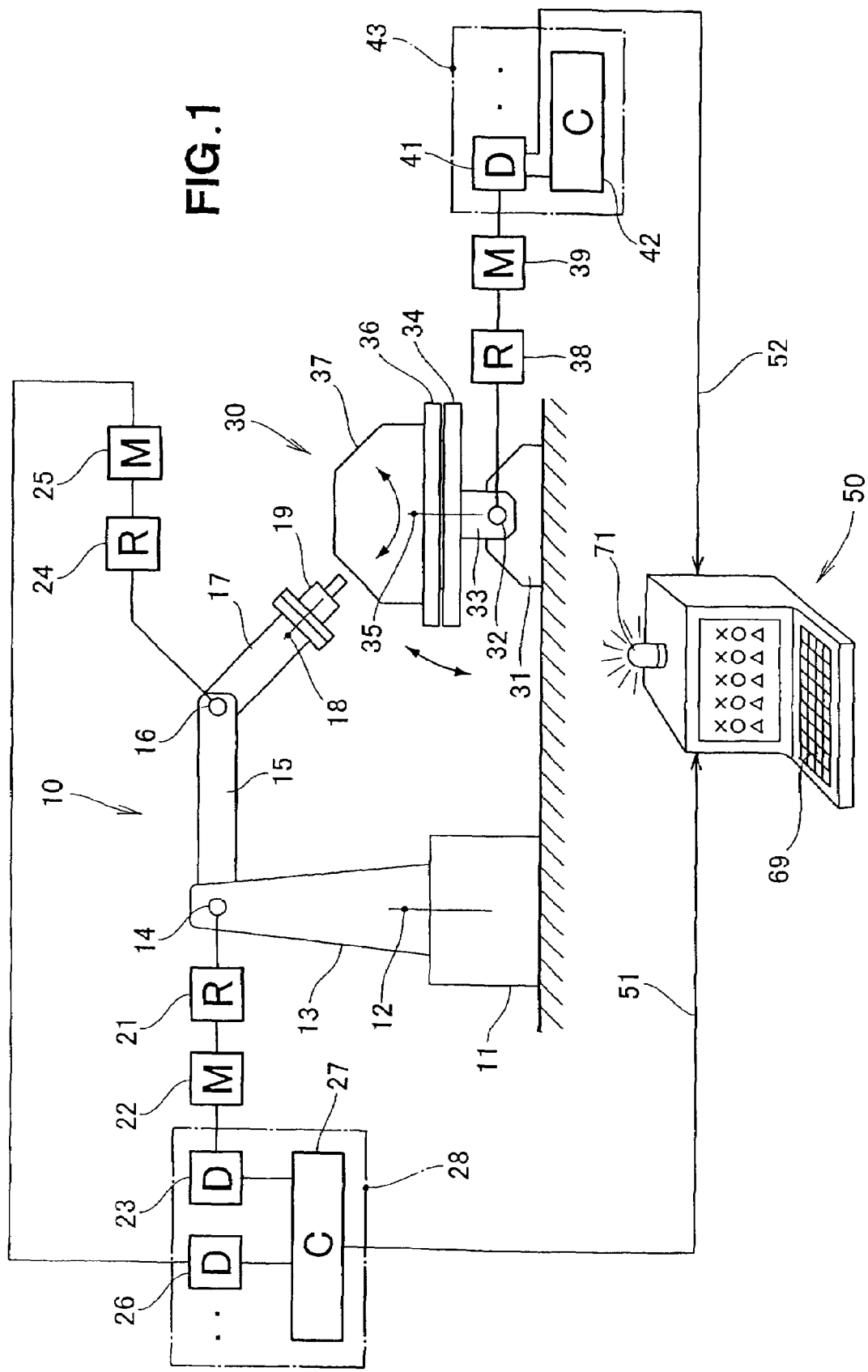
FIG. 1 is a block diagram showing a work machine in which the fault monitoring method according to the present invention is implemented.

In FIG. 1, a robot 10 and turntable 30 are shown as specific examples of work machines.

The robot 10 used as a work machine is an articulated robot composed of a first member 13 rotatably supported on a base 11 via a first shaft 12; a second member 15 oscillatably supported in a vertical direction on the first member 13 via a second shaft 14; a third member 17 oscillatably supported in a vertical direction on the second member 15 via a third shaft 16; and a fourth member 19 rotatably supported on the third member 17 via a fourth shaft 18. The robot 10 is called a welding robot when the fourth member 19 is a welding gun, and is called a painting robot when the fourth member 19 is a spray gun.

In this example, a second reducer 21 is connected to the second shaft 14 as a power transmission member, and a second servo motor 22 is connected to the second reducer 21. The rotational speed and other aspects of the second servo motor 22 are controlled by a second motor driver 23.

A third reducer 24 is connected to the third shaft 16 as a power transmission member in a similar manner, and a third servo motor 25 is connected to the third reducer 24. The rotational speed and other aspects of the third servo motor 25 are controlled by a third motor driver 26.

The first shaft 12 and fourth shaft 18 are configured in a similar manner; however, the power transmission member, servo motor, and motor driver are omitted.

The motor drivers 23, 26 and other motor drivers in the robot are housed together in a robot control board 28 along with a controller 27.

In the turntable 30 that is used as a work machine, an oscillating member 33 is mounted to a fixed member 31 via an oscillating shaft 32; a lower plate 34 is fixed to the oscillating member 33; and a rotating plate 36 is rotatably mounted to the lower plate 34 via a rotating shaft 35. A work piece 37 mounted to the rotating plate 36 is inclined about the oscillating shaft 32 and rotates about the rotation shaft 35. As a result, the orientation of the work piece 37 can be freely changed.

An oscillating reducer 38 is connected to the oscillating shaft 32 as a power transmission member, and an oscillating servo motor 39 is connected to the oscillating reducer 38. The oscillation speed and other aspects of the oscillating servo motor 39 are controlled by an oscillating motor driver 41.

The rotating shaft 35 is configured in a similar manner, but the power transmission member, servo motor, and motor driver are omitted.

The motor driver 39 and other motor drivers in the turntable are housed together in a turntable control board 43 along with a controller 42.

Preferably, a fault monitoring device 50 is disposed in the vicinity of the robot 10 and turntable 30, and signal wires 51, 52 are connected to the robot control board 28 and the turntable control board 43. The torque data is introduced to the fault monitoring device 50 from the controller 27 and motor driver 41 via these wires.

The second motor driver 23, third motor driver 26, and oscillating motor driver 41 shall be described in detail hereunder.

Figure 2:
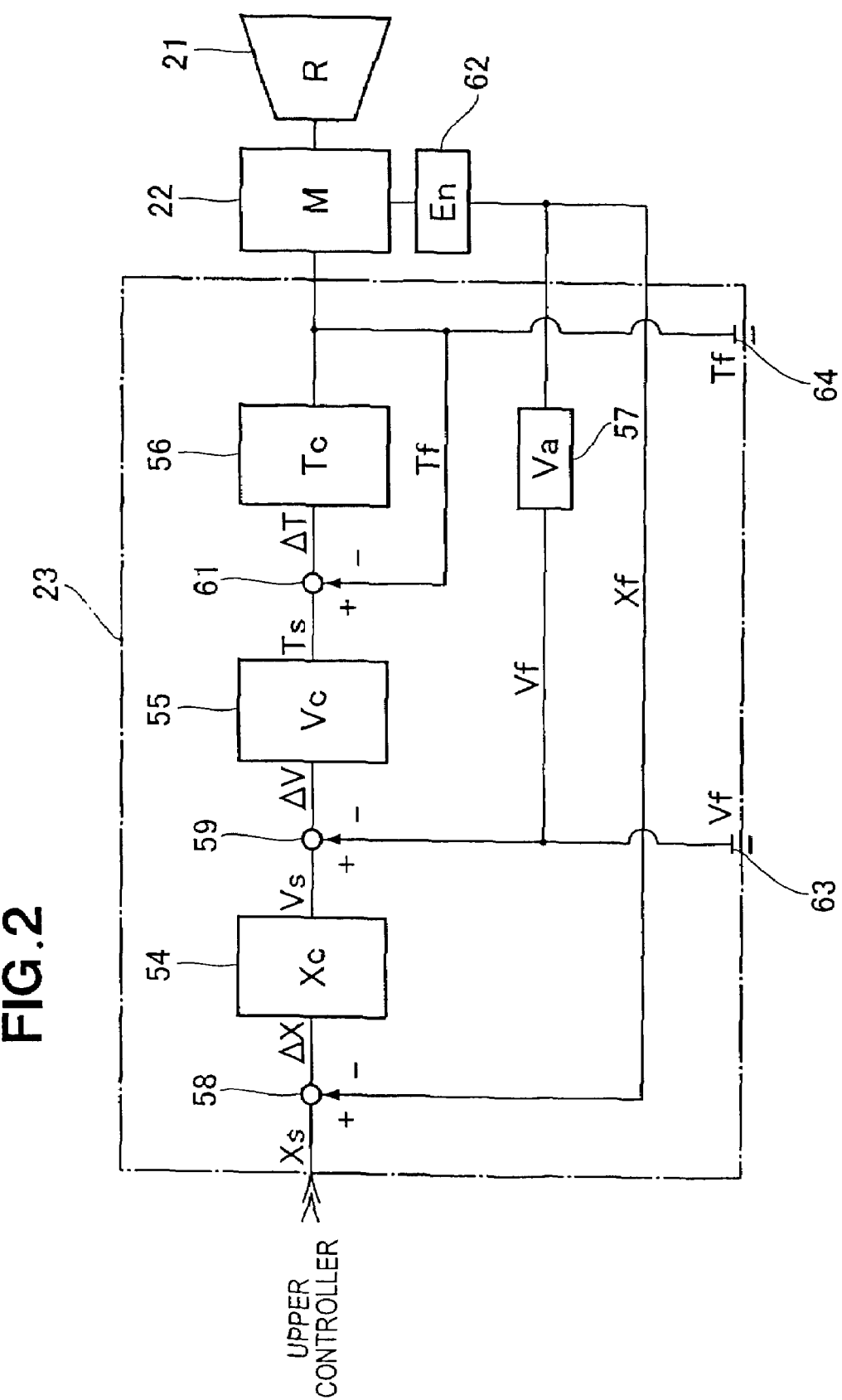
FIG. 2 is a block diagram showing a motor driver employed in the work machine of FIG. 1.

The second motor driver 23 has a position controller 54, a speed controller 55, an electric current amplifier 56, a speed converter 57, and three adders 58, 59, 61, as shown in FIG. 2. The rotational speed of the second servo motor 22 is monitored by a rotary encoder 62, fed back to the adder 58 in the form of a position feedback signal Xf, and used for positioning control.

When a command Xs is transferred from the upper controller to the second motor driver 23, the position feedback signal Xf is added by the adder 58. The position controller 54 that has received the resulting signal generates a speed command Vs.

The rotational speed of the second servo motor 22 is converted to a speed feedback signal Vf by the speed converter 57, and then fed back to the adder 59 and used for positioning control. In other words, the speed feedback signal Vf is added to the speed command Vs by the adder 59. The speed controller 55 that has received the resulting signal generates a torque command Ts.

A torque signal Tf is then added to the torque command Ts by the adder 61. The electric current amplifier 56 that has received the resulting signal outputs a drive current and drives the second servo motor 22.

The torque command signal Ts of the electric current amplifier 56 and the feedback signal Tf fed back to the torque command signal Ts are both electrical current values. However, in the present example, both indicate the magnitude of the torque of the second servo motor 22, and therefore correspond to "torque."

The second so-configured motor driver 23 can be obtained as a commonly available product, and comprises a speed terminal 63 able to extract a speed signal, and a torque terminal 64 able to extract torque data ("torque signal" hereunder).

The third motor driver 26, oscillating motor driver 41, and other motor drivers shown in FIG. 1 have the same configuration as the second motor driver 23, and a description thereof shall accordingly be omitted.

Figure 3A:
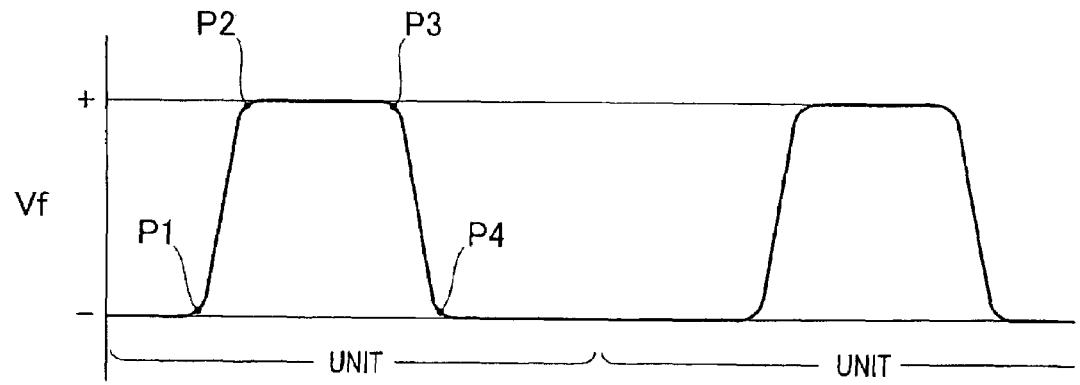
FIGS. 3A and 3B are graphs showing a rotational speed and an associated torque of the motor driver.

The speed signal extracted from the speed terminal 63 of FIG. 2 is described in FIG. 3A. As shown in FIG. 3A, changes in the rotational speed are recorded as a curved line in a graph in which the horizontal axis indicates time, and the vertical axis indicates the speed signal Vf of the rotational speed. In FIG. 3A, movement starts at point P1, a control speed is reached at point P2, deceleration starts at point P3, and the motor stops at point P4. The period that starts with the start of the movement and ends with the end of the movement is called a "unit." Two units are present in FIG. 3A.

Figure 3B:
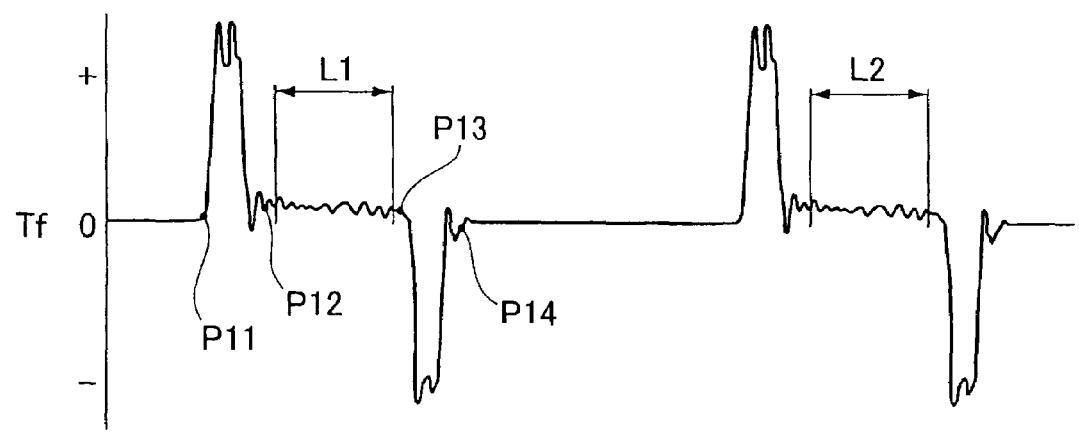

The torque extracted from the torque terminal 64 of FIG. 2 is described in FIG. 3B. Points that correspond to the points P1 through P4 shown in FIG. 3A are indicated by points P11 through P14 in FIG. 3B.

In FIG. 3B, change in torque is recorded via a curved line in a graph in which the horizontal axis indicates time, and the vertical axis indicates the torque signal Tf. In FIG. 3B, the torque suddenly decreases starting at point P11. When a control speed is reached, the torque gradually decreases and moves toward a minimum at point P12. Reverse torque is generated starting from point P13, and braking is performed. At around point P14, the rotational speed of the motor becomes zero and the torque approaches zero.

In general, the torque directly after point P11 is called starting torque, the torque after point P12 is called normal torque, and the torque directly after point P13 is called braking torque. As the starting torque and braking torque increase in magnitude, responsiveness improves, and the position and speed can be controlled very precisely.

Meanwhile, the region L1 in which the effects of the starting torque and braking torque are not experienced is regarded as a stable region for normal torque.

A range that contains one such region L1 corresponds to the "unit" shown in FIG. 3A. When the control is repeated, the next region L2 will appear. An enlarged view of the region L1 shall next be described.

Figure 4:
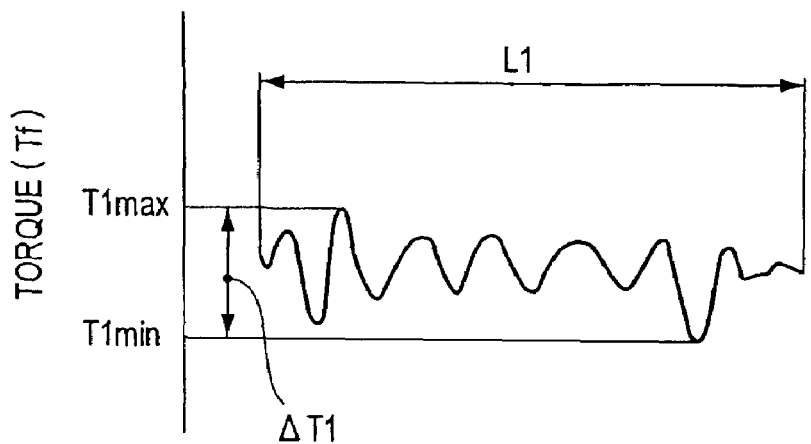
FIG. 4 is a graph showing on an enlarged scale a maximum fluctuation range of the torque.

The region L1 is the curved line of a waveform, as shown in FIG. 4. The region L1 of the first torque data contains one maximum torque and one minimum torque. The maximum torque shall be called T1max, and the minimum torque shall be called T1min. Maximum torque T1max−Minimum torque T1min is defined as a maximum fluctuation range $\Delta T1$ in the region L1 of the first torque data. The maximum fluctuation range ($\Delta T2$) is obtained from the region L2 (see FIG. 3) of the first torque in a similar manner. Maximum fluctuation ranges ($\Delta T3$ to $\Delta Tm$) of the first torque are obtained from the remaining regions (L3 to Lm) of the first torque data.

Figure 5:
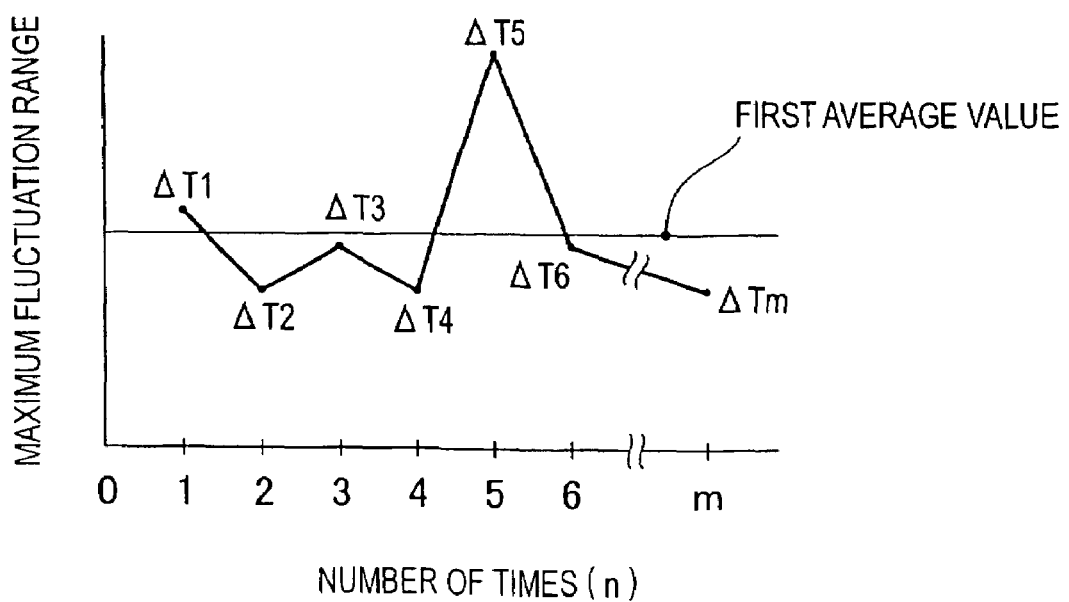
FIG. 5 is a view of a first average value of maximum fluctuation ranges.

A first average value is described in FIG. 5. In FIG. 5, the horizontal axis indicates the number of times (n), and the vertical axis indicates the maximum fluctuation range. In the graph, the maximum fluctuation ranges $\Delta T1$ to $\Delta Tm$ of the first torque data are plotted, and have data points that vary in the vertical direction. The horizontal line is a first average value obtained by averaging the maximum fluctuation ranges $\Delta T1$ to $\Delta Tm$ of the first torque data.

Steps of a basic data acquisition phase according to the present invention shall next be described on the basis of the above descriptions.

The basic data acquisition phase is configured as follows.

When the work machine is used in production for the first time, the point at which trial running is complete is preferably the basic data acquisition phase. When the power transmission mechanism of the work machine is repaired or a component is replaced, a point at which normal operation becomes possible is preferably the basic data acquisition phase. In other words, basic data is acquired when the work machine, particularly the power transmission mechanism, is not in a state of advanced deterioration over time. As long as deterioration over time has not occurred, the basic data can be acquired at any point, and the basic data acquisition phase therefore does not need to be set firmly.

Figure 6:
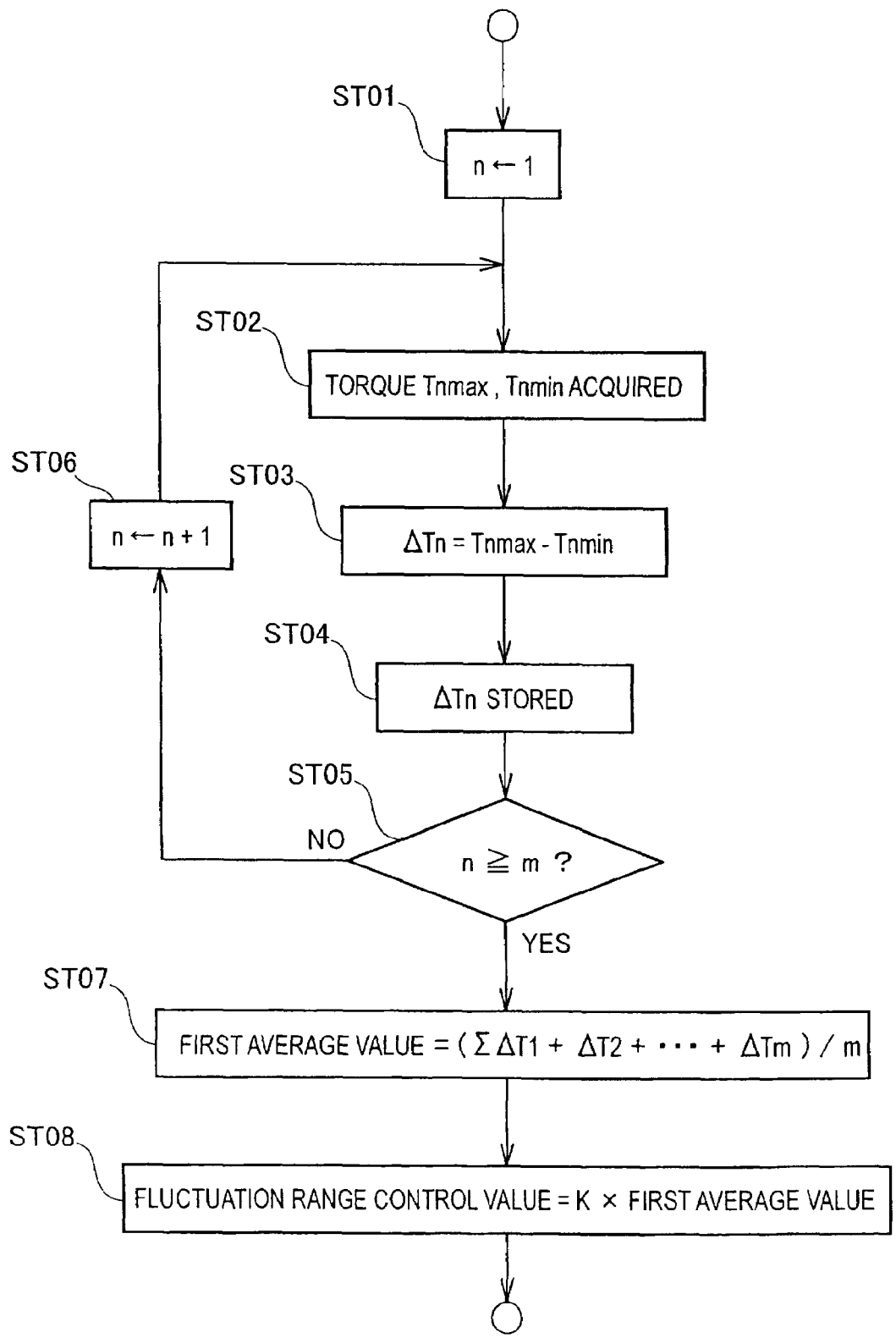
FIG. 6 is a flowchart showing the steps of a basic data acquisition phase.

FIG. 6 is a flowchart showing the steps of the basic data-acquisition phase.

Step (abbreviated as ST hereunder) 01: 1 is input for n.

ST02: T1max and T1min in the region L1 (FIG. 4) are acquired from the first torque data.

ST03: The maximum fluctuation range $\Delta T1$ of the first torque in the region L1 (FIG. 4) is calculated.

ST04: $\Delta T1$ is saved.

ST05: A decision is made as to whether n has reached a predetermined repeat count (maximum value) m.

ST06: If not; i.e., if n<m, then 1 is added to n, and the process returns to ST02.

ST07: Once the necessary $\Delta T1$ through $\Delta Tm$ have been acquired, an average value is determined, and the average value is set as the first average value. The first average value is not greatly affected by the $\Delta T5$ shown in FIG. 5.

ST08: The first average value is multiplied by K (where K is a value greater than 1.0), whereby a fluctuation range control value is set. K is set with consideration given to the degree to which the work machine is able to continue operating in a stable manner.

Preparation for normal operation is thus completed. Fault observation during normal operation ("fault monitoring") shall accordingly be described next.

Figure 7:
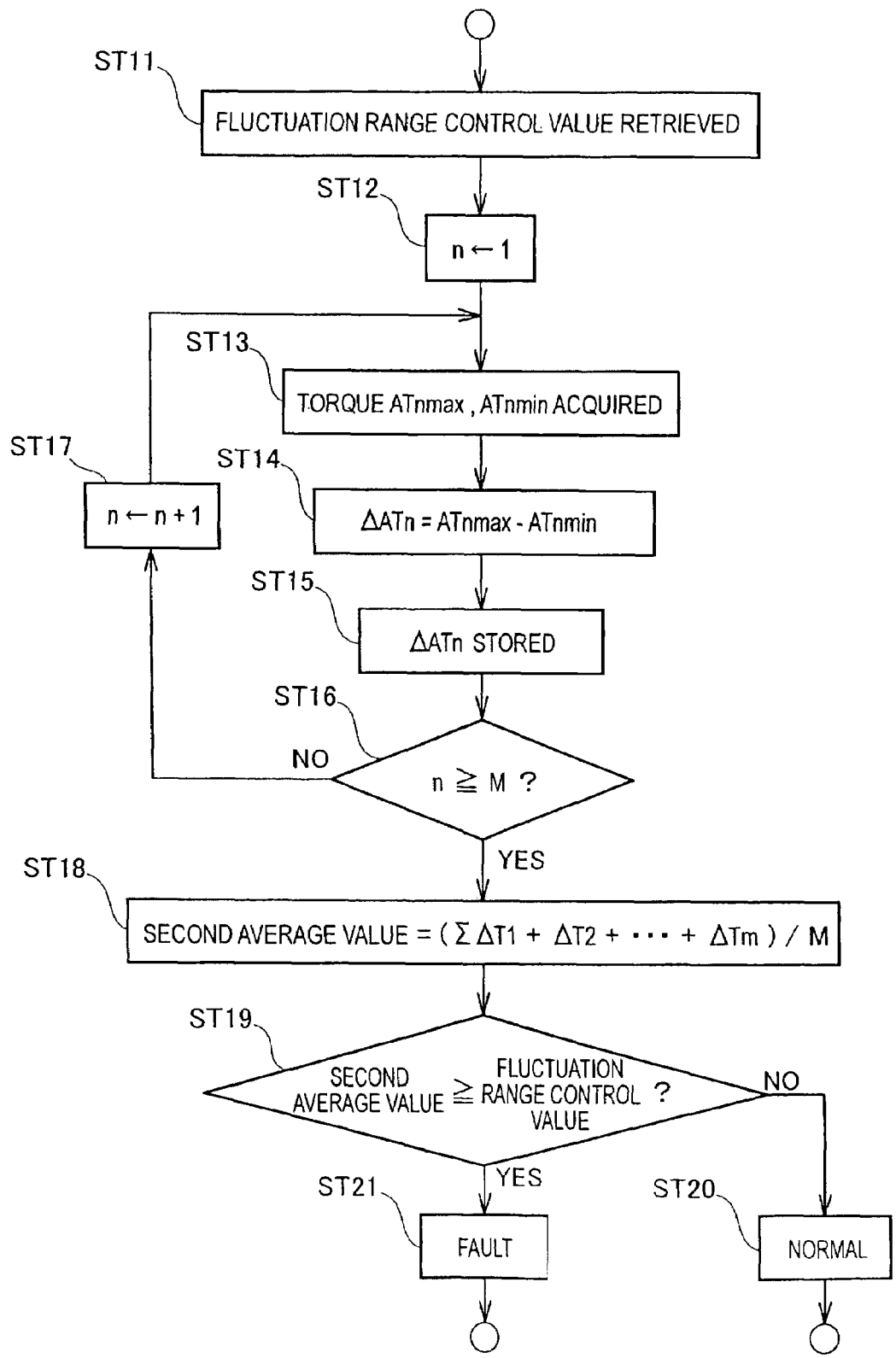
FIG. 7 is a flowchart showing the steps after a fluctuation range control value is selected.

FIG. 7 is a flowchart showing steps after the fluctuation range control value has been selected.

ST11: The fluctuation range control value (FIG. 6, ST08) is retrieved.

ST12: 1 is input as n.

Figure 8:
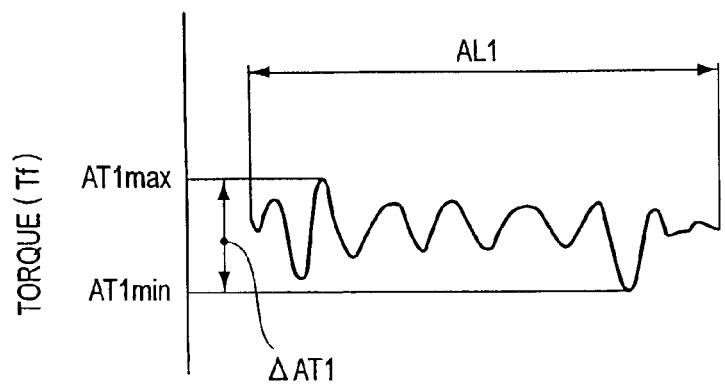
FIG. 8 is a waveform chart of steady torque during a normal operation.

A waveform diagram of regular torque during normal operation, i.e., the second torque data, shall next be described with reference made to FIG. 8. In FIG. 8, AL1 corresponds to a region during normal operation (corresponding to the region L1 shown in FIG. 4). The region AL1 of the second torque data contains one maximum torque and one minimum torque. The maximum torque shall be called AT1max, and the minimum torque shall be called AT1min. Maximum torque AT1max−Minimum torque AT1min is defined as the maximum fluctuation range $\Delta T1$ in the region AL1 of the second torque data.

Returning to FIG. 7:

ST13: AT1max and AT1min (FIG. 8) are acquired from the second torque data.

ST14: $\Delta AT1$ (FIG. 8), which is the maximum fluctuation range for the second torque, is calculated.

ST15: $\Delta AT1$ is saved.

ST16: A decision is made as to whether n has reached a predetermined repeat count (maximum value) M.

ST17: If not, i.e., if n<M, then 1 is added to n, and the process returns to ST13.

ST18: Once the necessary $\Delta AT1$ through $\Delta ATM$ have been acquired, an average value is determined and set as the second average value.

Figure 9:
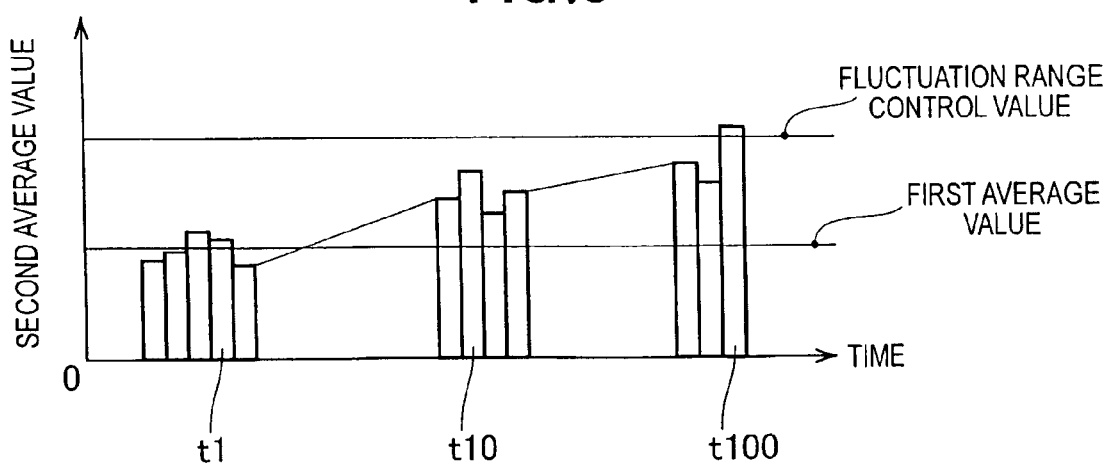
FIG. 9 is a graph describing the testing for a fault.

Variation in the second average value shall be described with reference made to FIG. 9. The horizontal axis indicates time, and the vertical axis indicates the second average value. In the graph, the first average value set in the basic data acquisition phase is included as a horizontal line, and a fluctuation range control value, which is twice the value of the first average value (i.e., K=2.0), is included as a horizontal line.

One bar of the bar graph indicates the second average value at a given point in time. The bar t1 is the second average value directly after the start of normal operation. This second average value is substantially level with the "first average value" indicated by the horizontal line.

The bar t10 represents a second average value after a short time has elapsed since the start of normal operation (e.g., six months), and the value is greater than the bar t1. In other words, the bar t10 indicates that the fluctuation range has increased.

The bar t100 represents a second average value after considerable time has passed since the start of normal operation (e.g., twenty-four months), and is markedly greater than the bar t1. The bar t100 indicates that the fluctuation range control value has been exceeded. A fault is determined to have occurred at the point at which the bar t100 appears.

Returning to FIG. 7:

ST19: A decision is made as to whether the second average value has exceeded the fluctuation range control value.

ST20: If the response in ST19 is "NO," the machine is in the state indicated by the bar t1 or t10 in FIG. 9, and is therefore normal.

ST21: If the response in ST19 is "YES," the machine is in the state indicated by the bar t100 in FIG. 9, and a warning signal is therefore generated.

A variety of faults can be expected to occur in work machines.

For example, in a gear-type reducer, wear on surfaces of the gear teeth and wear on a roller surface of a bearing that supports a rotating shaft develop over time. This phenomenon is referred to as aging. Aging occurs gradually, as described in FIG. 9.

An examination shall be made as to the suitability of a fault monitoring method that is an example of a prior art technique, wherein the maximum torque is constantly monitored and a fault is determined to have occurred when the torque exceeds a threshold value.

In a servo motor of a work machine, high torque may momentarily occur due to a variety of causes. If such high torque is taken into account when the threshold value is selected, the fault will be impossible to detect [using the prior art technique] if wear and other parameters are not in an advanced state. Minor faults wherein deterioration occurs gradually cannot be detected with methods for monitoring maximum torque using a threshold value.

For this reason, a maximum fluctuation range is obtained in the present invention for each unit during normal operation. This maximum fluctuation range is stored over a set period of time (e.g., several days or one week) and averaged to obtain the second average value. The second average value is compared with the fluctuation range control value. Employing an average value for the value of the object being monitored will minimize the effect caused by instantaneous fluctuation. In other words, instantaneous fluctuations are disregarded, allowing minor faults resulting from gradual deterioration to be efficiently detected.

A technique for providing uniform control over multiple servo motors shall be described hereunder.

Figure 10:
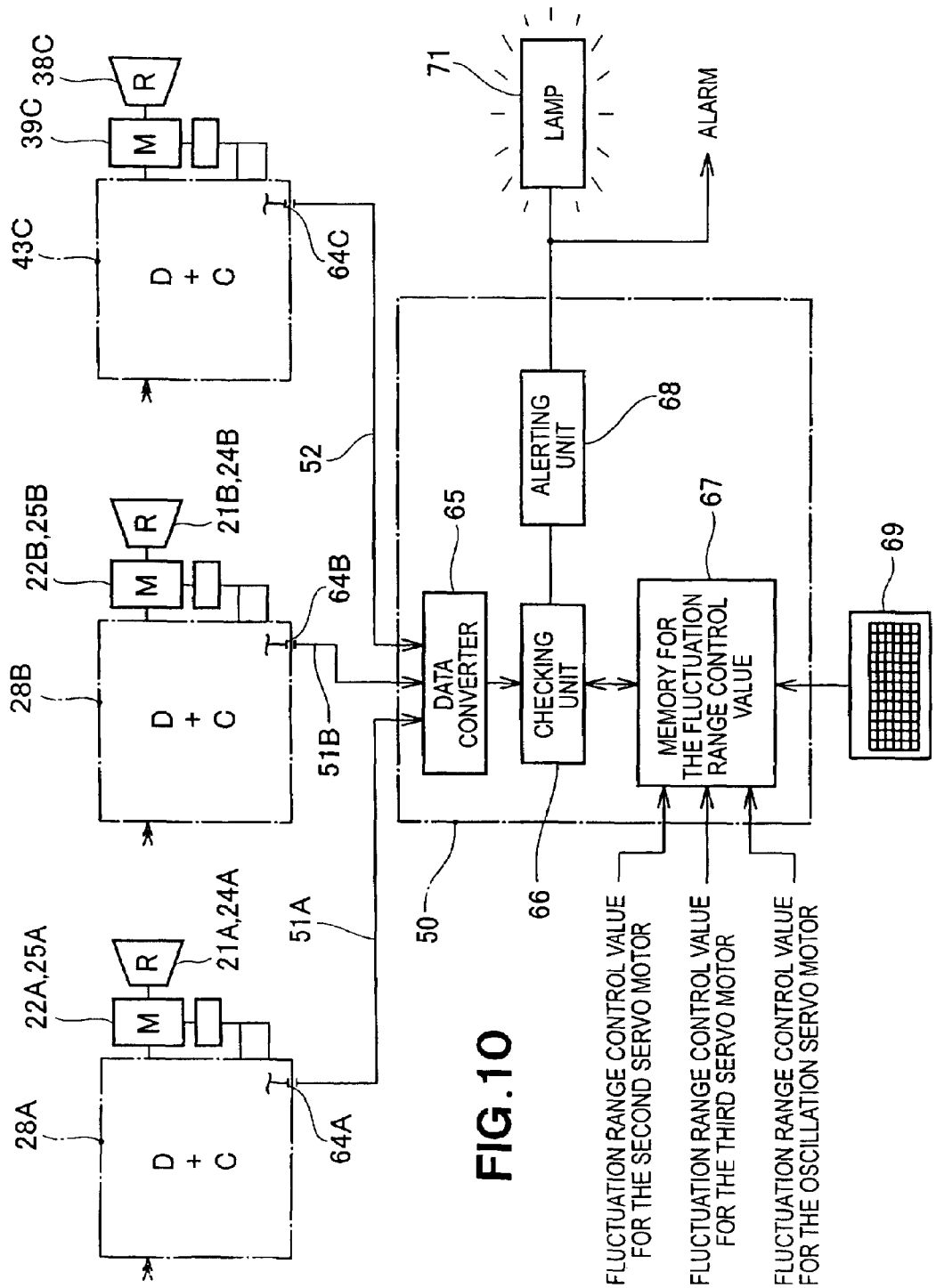
FIG. 10 is a block diagram of a fault monitoring device in which the fault monitoring method according to the present invention is implemented.

A fault monitoring device 50 comprises a data converter 65, a checking unit 66, a memory 67 for fluctuation range control values, and an alerting unit 68, as shown in FIG. 10.

The fault monitoring device 50 collectively monitors, e.g., a robot control board 28A for a robot (comprising, e.g., reducers 21A, 24A and servo motors 22A, 25A) manufactured by company A, a robot control board 28B for a robot (comprising, e.g., reducers 21B, 24B and servo motors 22B, 25B) manufactured by company B, a general-purpose device control board 43C for a general-purpose device (comprising, e.g., a reducer 38C and a servo motor 39C) manufactured by company C; and other control boards.

The data converter 65 acquires multiple torque data sets from a torque terminal 64A of the robot control board 28A, a torque terminal 64B of the robot control board 28B, a torque terminal 64C of the general-purpose device control board 43C, and torque terminals of the other control boards; converts the acquired data to consolidated data as necessary; and outputs the data in the stated order to the checking unit 66.

A fluctuation range control value for the second servo motor, a fluctuation range control value for the third servo motor, and a fluctuation range control value for the oscillation servo motor are stored in the memory 67 for fluctuation range control values. These fluctuation range control values are input or modified via a keyboard or other input means 69.

The sequence of actions shown in FIG. 7 is performed in parallel for a plurality (three in this example) of servo motors 22A, 22B, 39C by a single checking unit 66. When a fault is detected, the alerting unit 68 generates a warning signal, and the lamp 71 illuminates. An alarm may be sounded at the same time. If a lamp is illuminated an alarm is sounded, or another action is performed on the basis of the warning signal, a worker can be alerted, and serious accidents can be averted.

The present invention is characterized in that torque data is introduced to the checking unit 66. The torque terminals 64A, 64B, 64C are usually provided to the motor drivers 23, 26, 41 (FIG. 1), the controllers 27, 42 for controlling the motor drivers, or control boards 28A, 28B, 43C (FIG. 10) for accommodating the controllers. Torque can be obtained in joint units even if the model number or characteristics of the servo motors 22A, 22B, 39C are different.

The present invention is characterized in that a fluctuation range control value that corresponds to a threshold value is set for each of the servomotors of the work machine in the basic data acquisition phase, and a plurality of torque data sets is introduced to a single checking unit 66. Faults are accordingly monitored.

As a result, a plurality of servo motors can be centrally controlled by a single checking unit. When the servo motors are centrally controlled, the motors are more readily controlled, a single fault monitoring system will be sufficient, and space for installing the system can be reduced.

There are no limitations regarding the type of work machine in which the present invention is employed, provided that the machine is equipped with a servo motor and a power transmission mechanism for transmitting the output of the servo motor.

The power transmission mechanism may be a reducer, belt, gear, link, chain, or drive shaft, with no limitation placed on the type of mechanism.

The present invention is useful in monitoring faults in a work machine comprising a servo motor and a reducer or another power transmitting mechanism.

The invention claimed is:

1. A fault monitoring method for a robot or other work machine wherein output from a servo motor is transmitted via a reducer or other power transmission mechanism and a load is driven, the method comprising the steps of:
    acquiring first torque data generated from the servo motor, in units each of which starts when the motor starts operating and ends when the motor stops operating;
    selecting a maximum first torque fluctuation range designated by a difference between a maximum torque and a minimum torque for each unit obtained from the acquired first torque data;
    collecting maximum fluctuation ranges of the first torque for a plurality of cycles for obtaining a first average value of the maximum fluctuation ranges of the first torque;
    selecting a fluctuation range control value by multiplying the first average value by a factor greater than 1.0;
    acquiring second torque data generated from the servo motor, in units each of which starts when the motor starts operating and ends when the motor stops operating, after the fluctuation range control value has been selected;
    selecting a maximum second torque fluctuation range designated by a difference between a maximum torque and a minimum torque among the units obtained from the acquired second torque data;
    collecting second maximum fluctuation ranges for a plurality of cycles for obtaining a second average value of the second maximum fluctuation ranges;
    making a comparison to determine whether the second average value exceeds the fluctuation range control value; and
    determining, by a fault monitoring device, that a fault has occurred when the second average value exceeds the control value for the fluctuation range in the comparison.

2. The method of claim 1, wherein a plurality of servo motors is provided, a fluctuation range control value is set for each of the servo motors, and the servo motors are centrally controlled by a single checking unit.

3. The method of claim 2, wherein the acquired torque data is converted to consolidated data by a data converter and then sent to the checking unit.

4. The method of claim 1, wherein the first torque data and second torque data are acquired from a motor driver or controller for controlling the servo motor.

5. The method of claim 1, wherein a warning signal is generated from an alerting unit when a fault is determined in the step for determining that a fault has occurred.

* * * * *